(12) United States Patent
Choi (10) Patent No.: US 8,854,438 B2
(45) Date of Patent: Oct. 7, 2014

(54) DISPLAY SYSTEM, DISPLAY APPARATUS AND CONTROL METHOD THEREOF

(75) Inventor: Kyoung-oh Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1047 days.

(21) Appl. No.: 12/558,663

(22) Filed: Sep. 14, 2009

(65) Prior Publication Data

US 2010/0118128 A1 May 13, 2010

(30) Foreign Application Priority Data

Nov. 10, 2008 (KR) .................. 10-2008-0111227

(51) Int. Cl.
*H04N 13/04* (2006.01)

(52) U.S. Cl.
CPC ....... *H04N 13/0454* (2013.01); *H04N 13/0497* (2013.01); *H04N 13/0438* (2013.01)
USPC ............................................. 348/53

(58) Field of Classification Search
CPC .......... H04N 13/0438; H04N 13/0454; H04N 13/0497
USPC ............................................. 348/53
See application file for complete search history.

(56) References Cited

U.S. PATENT DOCUMENTS

2007/0229395 A1* 10/2007 Slavenburg et al. ............. 345/8
2008/0303963 A1* 12/2008 Jung et al. ....................... 349/13

* cited by examiner

*Primary Examiner* — Anner Holder
(74) *Attorney, Agent, or Firm* — Sughrue Mion, PLLC (57) ABSTRACT

Provided is a display apparatus which includes a display unit; an image processor which scans a three-dimensional image including a left or right eye image to the display unit; and a controller which adjusts a blanking time, during which neither the left eye image nor the right eye image is scanned, to be different from a reference time and controls the image processor to alternately scan the left and right eye images to the display unit based on the adjusted blanking time.

21 Claims, 9 Drawing Sheets

DISPLAY SYSTEM, DISPLAY APPARATUS AND CONTROL METHOD THEREOF

CROSS-REFERENCE TO RELATED APPLICATION

This application claims priority from Korean Patent Application No. 10-2008-0111227, filed on Nov. 10, 2008 in the Korean Intellectual Property Office, the disclosure of which is incorporated herein by reference.

BACKGROUND OF INVENTION

1. Field of Invention

Apparatuses and methods consistent with the present invention relate to a display system, a display apparatus and a control method thereof, which can display two-dimensional image or a three-dimensional image, and more particularly to a display system, a display apparatus and a control method thereof, which employ shutter-type glasses for a three-dimensional image.

2. Description of the Related Art

A display apparatus processes an image input from an image source and displays the processed image on a display panel such as a liquid crystal display (LCD) panel or the like. To display an input image on the display panel, the display apparatus scans a scan line having image information onto the display panel, and the scan line scanned onto the display panel forms an image frame.

The image input to the display apparatus may be classified into a two-dimensional image or a three-dimensional image. Human vision is capable of realizing a three-dimensional profile of an object due to different viewing angles of the two eyes. In this regard, the three-dimensional image input to the display apparatus is separated into a left eye image and a right eye image, which are alternately input, and correspondingly, shutter-type glasses may be provided in the display apparatus.

The shutter-type glasses for the display apparatus are selectively opened or closed according to whether the left eye image or the right eye image is displayed in the display apparatus while a user wears the shutter-type glasses. That is, a view of the left eye is opened when displaying the left eye image, while a view of the right eye is opened when displaying the right eye image. Thus, a user can recognize a solid body from the three-dimensional image.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

There is provided a display apparatus including: a display unit; an image processor which scans a three-dimensional image including a left or right eye image received from an outside to the display unit; and a controller which adjusts a blanking time, during which neither left nor right eye image is scanned, to be different from a preset reference time and controls the image processor to alternately scan the left and right eye images to the display unit on the basis of the adjusted blanking time when receiving the three-dimensional image.

The controller may increase the blanking time to be longer than the reference time by a preset time when receiving the three-dimensional image.

The controller may increase a scanning speed of the image processor on the basis of the increased blanking time.

The image processor may be capable of processing a two-dimensional image received from an external source, and the controller may set a blanking time of when the two-dimensional image is processed by the image processor into the reference time when receiving the three-dimensional image.

The display apparatus may further include: an image receiver which receives an input image from an external source; and an image detector which detects whether an image received in the image receiver is a two-dimensional image or a three-dimensional image, and sends a detection result to the controller.

The display apparatus may further include an image receiver which receives an input image from an external source, wherein the controller is capable of determining whether an image received in the image receiver is a two-dimensional image or a three-dimensional image.

The display apparatus may further include: a synchronous signal communicator which communicates with shutter-type glasses including a left eye unit and a right eye unit each of which can transmit and interrupt light; and a synchronous signal generator which generates a synchronous signal corresponding to a displaying period of the left eye image or the right eye image in the image processor and sends the synchronous signal through the synchronous signal communicator.

The controller may increase a frame rate for the three-dimensional image up to a level processible by the image processor if the frame rate is lower than the processible level.

The controller may control the image processor to scan the left eye image and the right eye image alternately on the basis of the increased frame rate when the frame rate for the three-dimensional image is increased.

Further, there is provided a method of controlling a display apparatus, the method including: adjusting a blanking time, during which neither left nor right eye image is scanned to a display unit, to be different from a preset reference time when receiving a three-dimensional image including a left or right eye image from an external source; and scanning the left and right eye images alternately to the display unit on the basis of the adjusted blanking time.

The adjusting the blanking time may include increasing the blanking time to be longer than the reference time by a preset time.

The adjusting the blanking time may include increasing a scanning speed of the image processor on the basis of the increased blanking time.

The display apparatus may be capable of processing a two-dimensional image received from an external source, and the adjusting the blanking time may include setting a blanking time of when the two-dimensional image is processed and displayed into the reference time.

The adjusting the blanking time may include: receiving an input image from an external source; and determining whether the input image is a two-dimensional image or a three-dimensional image.

The display apparatus may be capable of communicating with shutter-type glasses including a left eye unit and a right eye unit each of which can transmit and interrupt light; and the displaying the left eye image and the right eye image alternately may include generating a synchronous signal corresponding to a displaying period of the left eye image or the right eye image and sending the synchronous signal to the shutter-type glasses.

The adjusting the blanking time may include: increasing a frame rate for the three-dimensional image up to a level processible by the image processor if the frame rate is lower than the processible level.

The displaying the left eye image and the right eye image alternately may include scanning the left eye image and the right eye image alternately on the basis of the increased frame rate.

Also, there is provided a display system including: a display apparatus which is capable of displaying a three-dimensional image including a left or right eye image received from an external source; and shutter-type glasses which selectively transmit and interrupt light synchronously with a displaying period of the three-dimensional image, the display apparatus including: a display unit; an image processor which processes the three-dimensional image to be displayable on the display unit; and a controller which adjusts a blanking time, during which neither left nor right eye image is scanned, to be different from a preset reference time and controls the image processor to alternately scan the left and right eye images to the display unit on the basis of the adjusted blanking time when receiving the three-dimensional image.

The controller may increase the blanking time to be longer than the reference time by a preset time when receiving the three-dimensional image.

The controller may increase a scanning speed of the image processor on the basis of the increased blanking time.

The image processor may be capable of processing a two-dimensional image received from an external source, and the controller may set a blanking time of when the two-dimensional image is processed by the image processor into the reference time when receiving the three-dimensional image.

The shutter-type glasses may include: a left eye unit and a right eye unit each of which transmits and interrupts light; and a shutter controller which controls the left eye unit or the right eye unit to be selectively opened and closed corresponding to the left eye image or the right eye image displayed during the blanking time.

The shutter-type glasses may further include a synchronous signal receiver which receives a synchronous signal corresponding to a displaying period of the left eye image and the right eye image and sends the synchronous signal to the shutter controller.

The display apparatus may includes: an image receiver which receives an input image from an external source; and an image detector which detects whether an image received in the image receiver is a two-dimensional image or a three-dimensional image, and sends a detection result to the controller.

The display apparatus may further include an image receiver which receives an input image from an external source, and the controller may be capable of determining whether an image received in the image receiver is a two-dimensional image or a three-dimensional image.

The display system may further include: a synchronous signal communicator which communicates with shutter-type glasses; and a synchronous signal generator which generates a synchronous signal corresponding to a displaying period of the left eye image or the right eye image in the image processor and sends the synchronous signal through the synchronous signal communicator.

At least one of the synchronous signal communicator and the synchronous signal generator may be provided in the display apparatus.

The controller may increase a frame rate for the three-dimensional image up to a level processible by the image processor if the frame rate is lower than the processible level.

The controller may control the image processor to scan the left eye image and the right eye image alternately on the basis of the increased frame rate when the frame rate for the three-dimensional image is increased.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments of the present invention will be described in detail with reference to accompanying drawings so as to be easily realized by a person having ordinary knowledge in the art. The present invention may be embodied in various forms without being limited to the exemplary embodiments set forth herein. Descriptions of well-known parts are omitted for clarity, and like reference numerals refer to like elements throughout.

Figure 1:
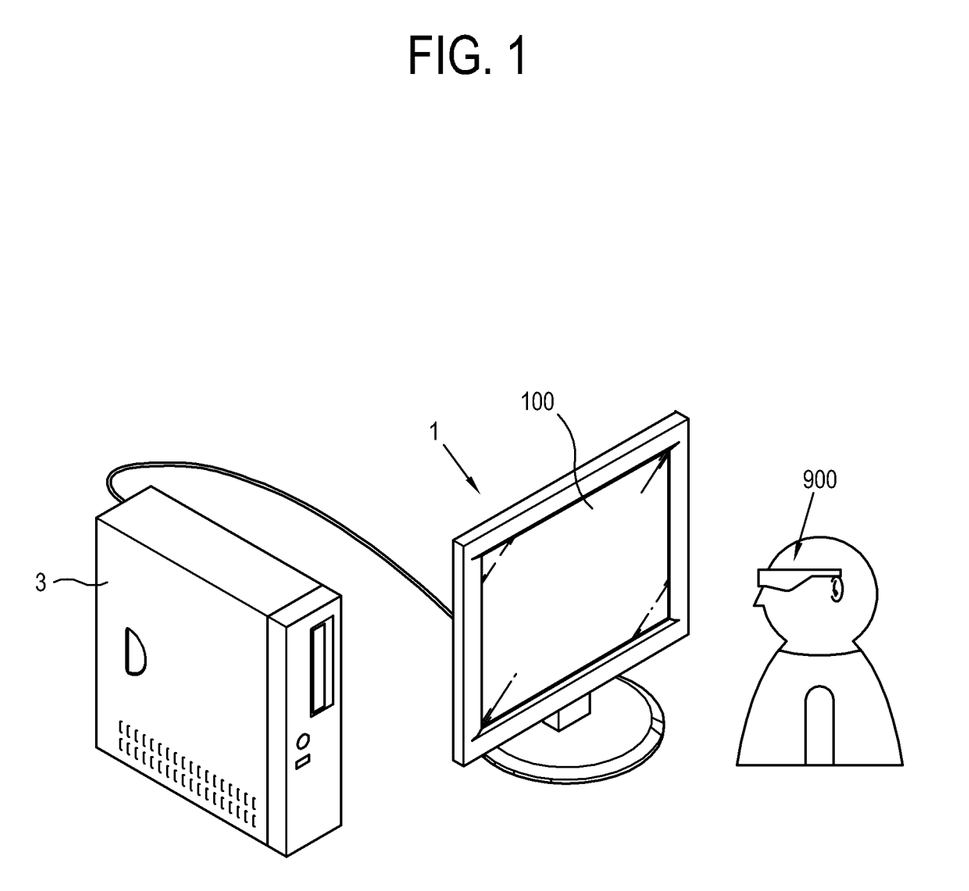
FIG. 1 illustrates a display system according to an exemplary embodiment of the present invention.

FIG. 1 illustrates a display system according to an exemplary embodiment of the present invention.

As shown in FIG. 1, the display system in this embodiment includes an image source 3 which supplies an image, a display apparatus 1 which has a display unit 100 and processes an image supplied from the image source 3 to display the processed image on the display unit 100, and shutter-type glasses 900 which operates corresponding to whether a three-dimensional image is displayed on the display unit 100.

The image source 3 generates an image or receives an image from an external source, and supplies the image to the display apparatus 1. The image source 3 may include a computer which generates an image with a central processing unit (CPU, not shown) and a graphic card (not shown) and provides the image locally; a server which can provide an image through network; a transmitter of a broadcasting station which transmits a broadcasting signal through airwaves or a cable; and so on, but not limited thereto. In this exemplary embodiment, the computer is used as the image source 3, which does not limit the spirit of the invention.

The display apparatus 1 includes a computer monitor connected to the computer or a television. The display apparatus 1 receives a two-dimensional image or a three-dimensional image from the image source 3 and processes the two-dimensional and three-dimensional images to be displayed on the display unit 100, respectively. Here, the three-dimensional image is divided into a left eye image corresponding to a user's left eye, and a right eye image corresponding to a user's right eye.

The display apparatus 1 alternately displays the left eye image and the right eye image in a unit of frame when receiving the three-dimensional image.

The shutter-type glasses 900 selectively open and close a view of a user's left or right eye according to which one of the left eye image and the right eye image is displayed on the display unit 100 when the display apparatus 1 displays the three-dimensional image. For example, while the left eye image is displayed on the display unit 100, the shutter-type glasses 900 open the view of the left eye but close the view of the right eye. On the other hand, while the right eye image is displayed on the display unit 100, the shutter-type glasses 900 open the view of the right eye but close the view of the left eye.

Figure 2:
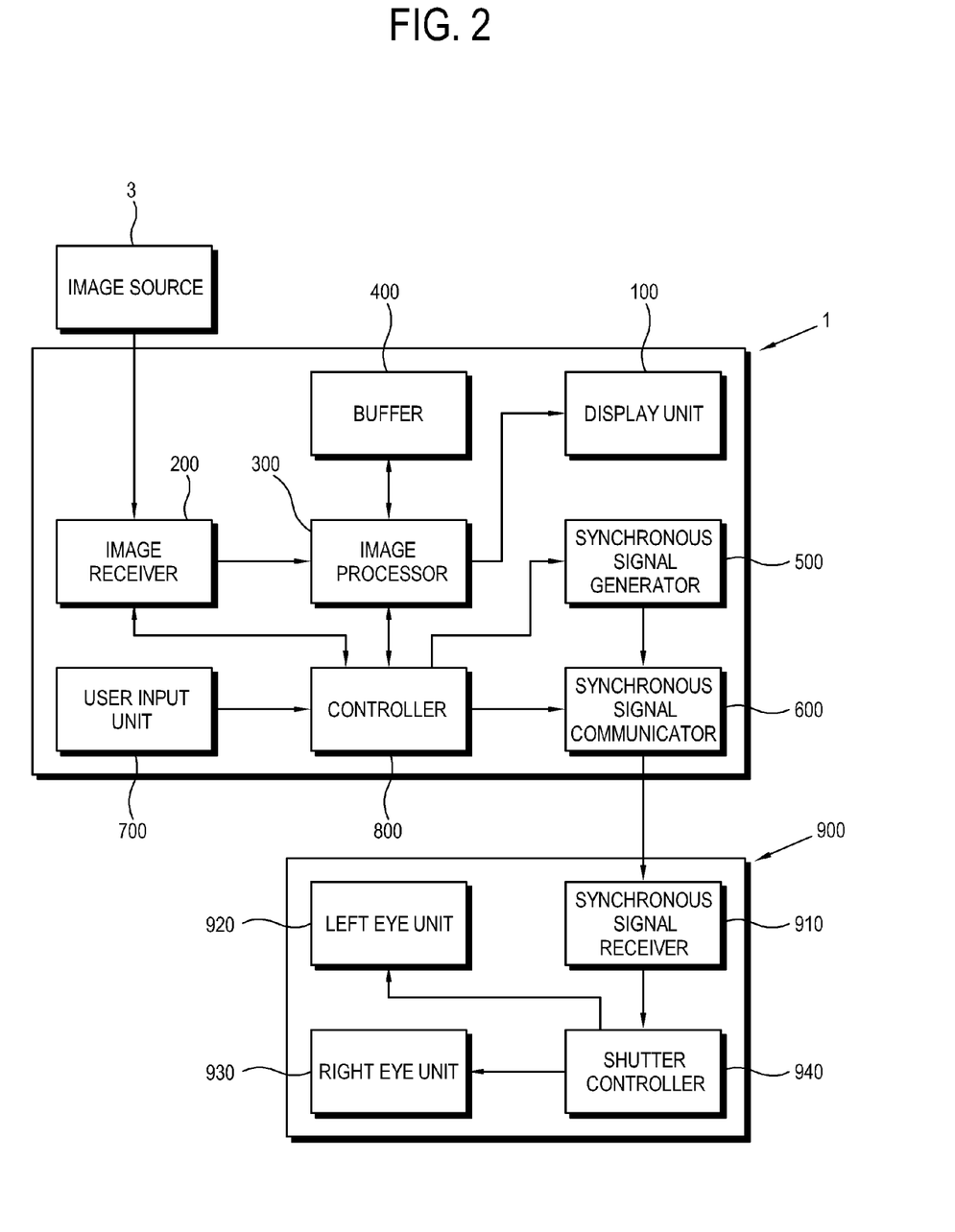
FIG. 2 is a block diagram of the display system in FIG. 1 according to an exemplary embodiment.

Below, elements of the display apparatus 1 and the shutter-type glasses 900 according to an exemplary embodiment will be described with reference to FIG. 2. FIG. 2 is a block diagram of the display system in FIG. 1.

As shown in FIG. 2, the display apparatus 1 in this embodiment includes a display unit 100; an image processor 300 which processes an image input from the image source 3 and scans the processed image to be displayed on the display unit 100; and a controller 800 which adjusts a blanking time, during which the left eye image or the right eye image is not scanned by the image processor, to be different from a preset reference time and correspondingly controls the image processor 300 to alternately scan the left image and the right image.

Also, the display apparatus 1 includes an image receiver 200 which receives an image supplied from the image source 3; a buffer 400 which temporarily stores image data to be processed by the image processor 300; a synchronous signal generator 500 which generates a synchronous signal corresponding to a displaying period of an image processed by the image processor 300; a synchronous signal communicator 600 which transmits the synchronous signal generated by the synchronous signal generator 500 to the shutter-type glasses 900; and a user input unit 700 through which a preset input command input by a user is sent to the controller 800.

According to the present exemplary embodiment, the synchronous signal generator 500 and the synchronous signal communicator 600 are provided as the sub elements of the display apparatus 1, but not limited thereto. Alternatively, at least one of the synchronous signal generator 500 and the synchronous signal communicator 600 may be provided independently of the display apparatus 1.

The shutter-type glasses 900 includes a synchronous signal receiver 910 which receives the synchronous signal from the synchronous signal communicator 600; a left eye unit 920 and a right eye unit 930 each of which can transmit and interrupt light; and a shutter controller 940 which controls the left eye unit 920 and the right eye unit 930 to be selectively opened and closed in response to the synchronous signal received in the synchronous signal receiver 910.

With this configuration, the display apparatus 1 increases the blanking time, during which neither a left eye image nor a right eye image is scanned to the display unit 100, by the preset time with respect to the reference time when receiving the three-dimensional image from the image source 3. Further, the shutter-type glasses 900 selectively open the left eye unit 920 or the right eye unit 930 in response to an image displayed in the display unit 100 between the left eye image and the right eye image during the blanking time.

Thus, in the case that the image source 4 provides the three-dimensional image, the three-dimensional image can be displayed without increasing bandwidths for processing and transmission as compared with those of the two-dimensional image.

The following descriptions are related to each element.

The display unit 100 may be achieved by an LCD panel or the like, and displays an image processed by the image processor 300. The display unit 100 displays one image frame by vertically arranging a plurality of horizontal scanning lines.

The image receiver 200 receives an input image from the image source 3 through a wire or wirelessly and sends the input image to the image processor 300. To this end, the image receiver 200 may have various standards determined according to types of the image source 3 and the display apparatus 1 and formats of an image output from the image source 3.

For example, in the case that a computer monitor is employed as the display apparatus 1, the image receiver 200 may utilize standards of D-SUB for transmitting red, green and blue (RGB) signals based on video graphics array (VGA); or digital video interactive-analog (DVI-A), DVI-I (integrated digital/analog), and DVI-D (digital) based on DVI; high definition multimedia interface (HDMI), etc.

The DVI supports a transmission type of a single link and a dual link based on transition minimized differential signaling (TMDS). For a high resolution, e.g., more than a resolution of 1920×1080 at 60 Hz, the dual link may be used.

Alternatively, the image receiver 200 may be achieved by a DisplayPort, a unified display interface (UDI), a wireless HD, or etc.

In the case that a television or the like is used as the display apparatus 1, the image receiver 200 may receive a radio frequency signal from a broadcasting station (not shown) wirelessly, or may receive an input image based on standards such as composite video, component video, super video, Syndicat des Constructeurs d'Appareils Radiorécepteurs et Téléviseurs (SCART), HDMI, etc.

The image processor 300 processes the image received in the image receiver 200 into the plurality of horizontal scanning lines corresponding to each frame, and scans them to the display unit 100. The image processor 300 scans the image from the top to the bottom of a display region of a panel of the display unit 100, and scans an image of the next frame after a lapse of a preset blanking time from the time when one frame is completely scanned.

During the blanking time, the image processor 300 does not scan an image, so that the display unit 100 displays the image of the frame scanned directly before the blanking time.

When receiving the three-dimensional image, the image processor 300 alternately scans the left eye image and the right eye image on the display unit 100. Thus, the image displayed on the display unit 100 during the blanking time is the left eye image or the right eye image scanned just before the blanking time.

The image processor 300 may have various configurations for the above operations. For example, although not shown, the image processor 300 may include a scaler block for converting an input image to have a size and a resolution displayable in the display unit; a block for selectively changing a frame rate of an input image; a block of scanning an image to the display unit 100, etc. These configurations may be provided separately or integrated into one chip.

The buffer 400 temporarily stores image data to be processed by the image processor 300 before displaying it on the display unit 100.

The synchronous signal generator 500 generates a synchronous signal corresponding to a scanning period, during which the image processor 300 scans an image to the display unit 100, and a blanking period corresponding to a displaying period of an image displayed on the display unit in the case where the image processor 300 processes the three-dimensional image.

The synchronous signal generator 500 in this exemplary embodiment generates two synchronous signals corresponding to the left eye image and the right eye image, respectively, but not limited thereto.

Specifically, the synchronous signal generator 500 makes the synchronous signal low during the scanning period during which the left eye image or the right eye image is displayed on the display unit 100, but makes the synchronous signal high selectively corresponding to one of the left eye image or the right eye image displayed on the display unit 100 during the blanking period.

For example, in the case where the synchronous signal is generated corresponding to the left eye image, the synchronous signal generator 500 makes the synchronous signal low during the scanning period of the image. On the other hand, in the case of the blanking period, the synchronous signal generator 500 makes the synchronous signal high while the left eye image is displayed on the display unit 100, but makes the synchronous signal low while the right eye image is displayed. Likewise, in the case where the synchronous signal is generated corresponding to the right eye image, the same principle may be applied.

In this manner, the synchronous signal generator 500 generates the synchronous signals corresponding to the left eye image and the right eye image, respectively.

The synchronous signal communicator 600 sends the generated synchronous signal to the synchronous signal receiver 910 of the shutter-type glasses 900. The synchronous signal communicator 600 may use wired or wireless communication to transmit the synchronous signal. In the case of the wireless communication, an infrared or radio frequency signal or the like may be employed.

The user input unit 700 is manipulated by a user to control operation of the display apparatus 1 or the shutter-type glasses 900. Here, the user input unit 700 may be achieved by a menu key installed on the outside of the display apparatus 1, a remote controller, etc.

When the image receiver 200 receives an input image, the controller 800 controls the image processor 300 so that the input image can be scanned and displayed on the display unit 100. The controller 800 determines whether the input image is the two-dimensional image or the three-dimensional image before the input image is processed by the image processor 300. The determination of the input image in the controller 800 is not limited thereto. For example, the input image may be determined by sampling it in the image receiver 200 or by a predetermined process implemented in the image processor 300.

Figure 3:
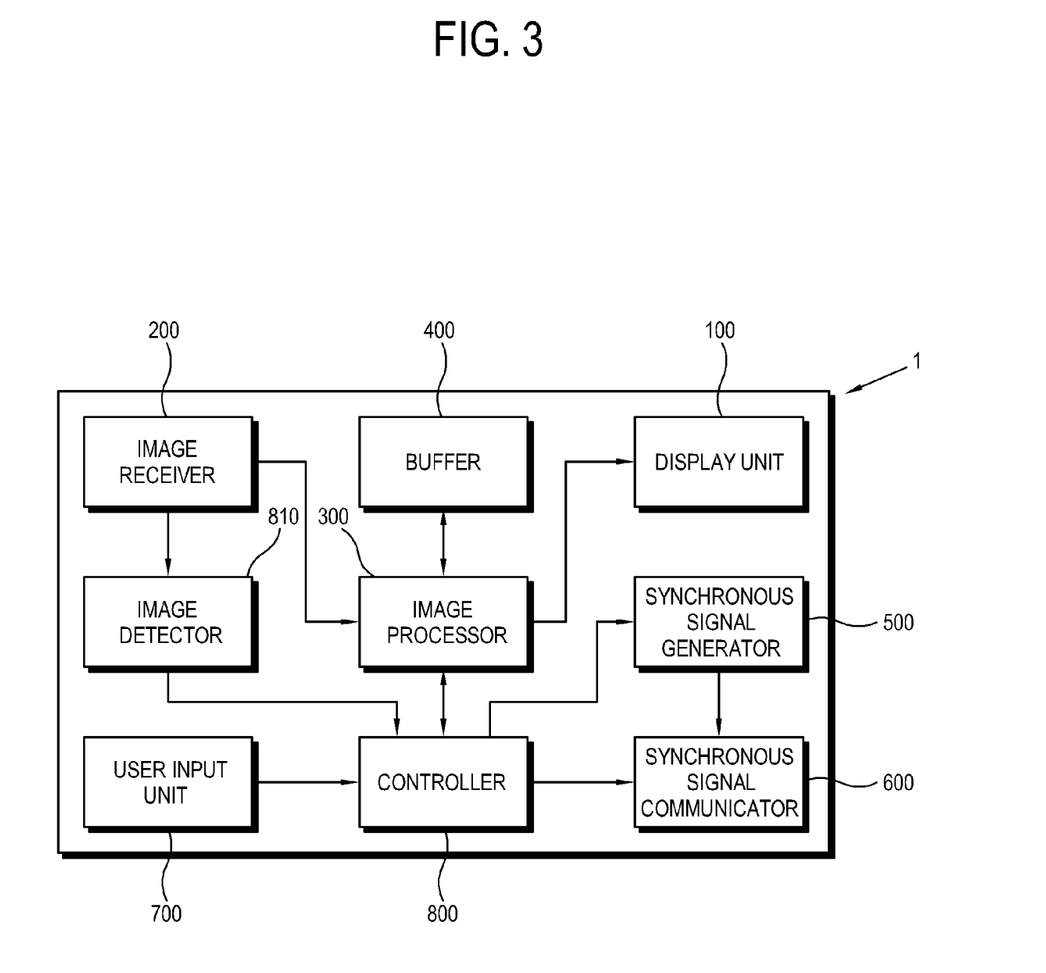
FIG. 3 is a block diagram of a display apparatus according to another exemplary embodiment of the present invention.

In this exemplary embodiment, the controller 800 determines whether the input image is the three-dimensional image, but not limited thereto. Alternatively, as shown in FIG. 3, the controller 800 may further include an image detector 810. In this case, the display apparatus 1 may detect whether the input image received in the image receiver 200 is the two-dimensional image or the three-dimensional image and send a detection result to the controller 800, so that the controller 800 can determine whether the input image is the three-dimensional image or not. The image detector 810 may be provided independently of the controller 800, or may be integrated into the controller 800.

As shown in FIG. 2, the controller 800 controls the blanking period between the scanning periods of the image processor 300 to be equal to the preset reference time when determining that the input image is the two-dimensional image. Here, the reference time may be previously set in a manufacturing stage of the display apparatus 1.

On the other hand, the controller 800 increases the blanking period as compared with that of the two-dimensional image when determining that the input image is the three-dimensional image. In detail, the controller 800 increases the blanking period to be longer than the reference time by the preset time. Here, the preset time is variable depending on diverse factors such as characteristics of an input image, a processing performance of the display apparatus 1, etc.

Thus, if the blanking time increases while processing the three-dimensional image, either of the left or right eye image is increased in the displaying period, so that a user can recognize the three-dimensional image more clearly. Further, it is possible to secure a time during which the left eye unit 920 or the right eye unit 930 of the shutter-type glasses 900 is opened, because the blanking time increases.

The controller 800 controls the image processor 300 to scan the left eye image and the right eye image alternately on the basis of the increased blanking time. At this time, the scanning time of an image is decreased as the blanking time increases. Accordingly, the controller 800 increases an image scanning speed of the image processor 300 in accordance with the increased blanking time, so that all scanning lines for one frame can be scanned during the decreased scanning time.

The controller 800 controls the synchronous signal generator 500 to generate the synchronous signal in accordance with the displaying period of the left or right image and which image is displayed during the blanking time. Then, the synchronous signal is sent to the shutter-type glasses 900 through the synchronous signal communicator 600, and thus the left eye unit 920 and the right eye unit 930 of the shutter-type glasses 900 are selectively opened or closed.

Below, an exemplary control operation of the controller 800 will be described with reference to FIGS. 4 and 5.

Figure 4:
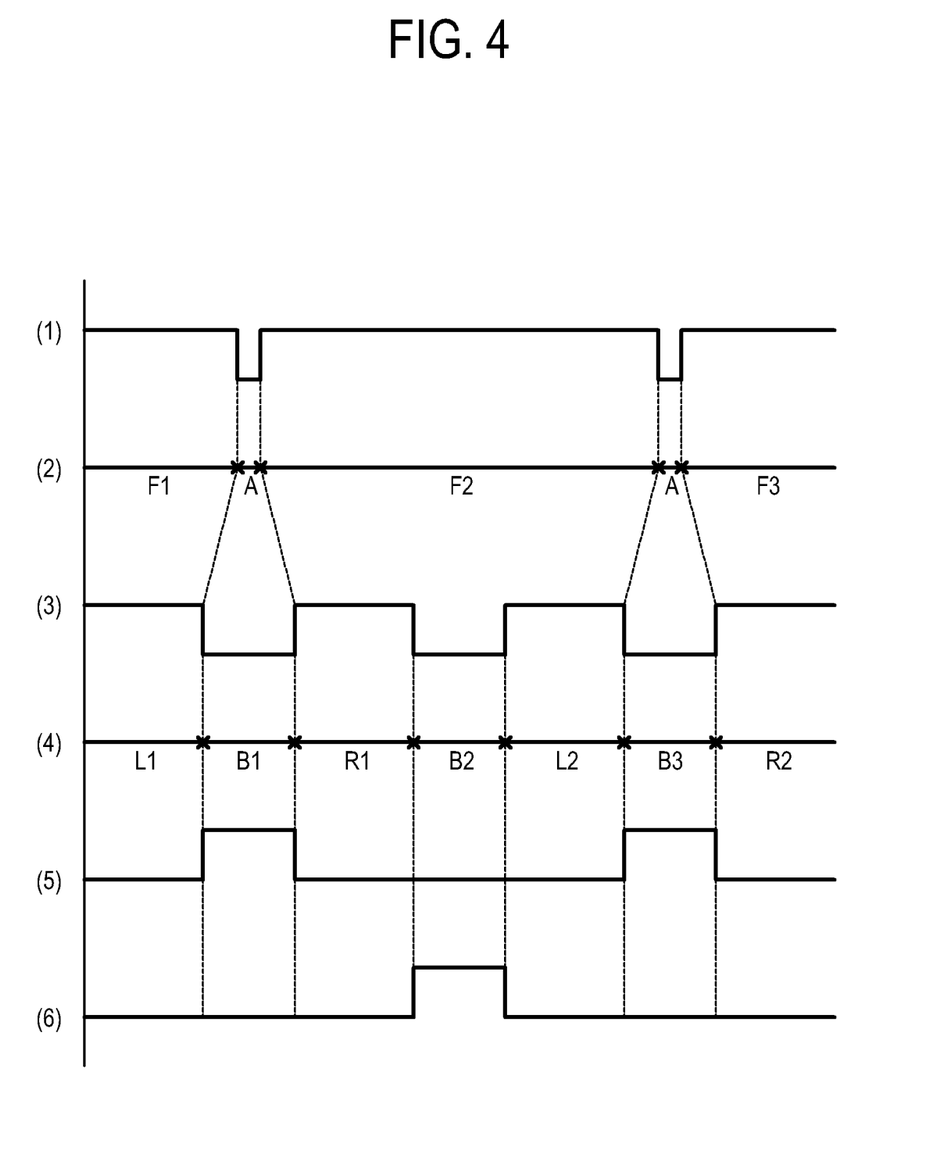
FIG. 4 is a duty ratio graph showing a timing comparison with regard to a scanning period and a blanking period for an image, and a corresponding synchronous signal in a display apparatus in FIG. 1.

FIG. 4 is a duty ratio graph showing a timing comparison with regard to a scanning period and a blanking period for an image in the image processor 300, and a corresponding synchronous signal.

In FIG. 4, a horizontal axis of each graph shows a time.

The graph (1) shows the scanning period and the blanking period of an image in the image processor 300 when receiving the two-dimensional image. The graph (2) shows the image displayed corresponding to each period of the graph (1).

In the graph (1), a high level indicates that an image is scanned, and a low level indicates that no image is scanned. In the respective image scanning sections, image frames F1, F2 and F3 are scanned in sequence with the blanking section interposed therebetween. Here, the width of a blanking section A is set to be equal to the reference time.

Like this, in the case that the two-dimensional image is scanned and displayed, the two-dimensional image does not distinguish between the left eye image and the right eye image, so that there is no need of generating the synchronous signal or operating the shutter-type glasses 900.

The graph (3) shows the scanning period and the blanking period of an image when receiving the three-dimensional image. The graph (4) shows the image displayed corresponding to each period of the graph (3).

In the graph (3), a high level indicates that an image is scanned, and a low level indicates that no image is scanned. In the case of the three-dimensional image, the left eye image and the right eye image are alternately scanned, so that the left eye images L1 and L2 and the right eye images R1 and R2 are alternately scanned with the blanking sections B1, B2, B3 interposed therebetween as shown in the graph (4).

As shown in the graphs (1) and (4), the three-dimensional image is divided into the left eye image and the right eye image, so that the three-dimensional image has a frame rate faster than that of the two-dimensional image. For example, if the two-dimensional image has a frame rate of 60 Hz, the three-dimensional image has a doubled frame rate of 120 Hz.

The controller 800 increases the width of the blanking section B1, B2 and B3 to be larger than the width A of the two-dimensional image as shown in the graph (4) when determining that the three-dimensional image is input. That is, the controller 800 increases the blanking time for the three-dimensional image to be longer than the reference time by the preset time. Thus, the width of the scanning section L1, R1, L2 and R2, i.e., the scanning time is decreased, and thus the controller 800 increases the scanning speed depending on the decreased scanning time.

The graphs (5) and (6) show duty ratios of the synchronous signal generated corresponding to the left eye image and the right eye image, respectively, on the basis of the graph (3) and (4).

In the graph (5), a low level indicates that the left eye image or the right eye image is scanned, and a high level indicates that the left eye image is displayed on the blanking section. In the graph (6), a low level indicates that the left eye image or the right eye image is scanned, and a high level indicates that the right eye image is displayed on the blanking section.

The controller 800 transmits the synchronous signals as shown in the graphs (5) and (6) to the shutter-type glasses 900, and the shutter controller 940 opens or closes the left eye unit 920 or the right eye unit 930 in response to the synchronous signal.

That is, the shutter controller 940 opens the left eye unit 920 in the sections B1 and B3 of the graph (4) and (5), and closes the left eye unit 930 in the other sections.

Further, the shutter controller 940 opens the right eye unit 930 in the section B2 of the graph (4) and (6), and closes the right eye unit 920 in the other sections.

With this configuration, when the three-dimensional image is input, the blanking time, during which the left eye image and the right eye image are not scanned to the display unit 100, is increased by the preset time as compared with that of the two-dimension image.

Below, an example that the image processor 300 scans an image to the display unit 100 like the graphs (3) and (4) of FIG. 4 will be described with reference to FIG. 5. FIG. 5 illustrates an image scanning method in the scanning sections and the blanking sections when the three-dimensional image is input like the graph of FIG. 4.

Figure 5:
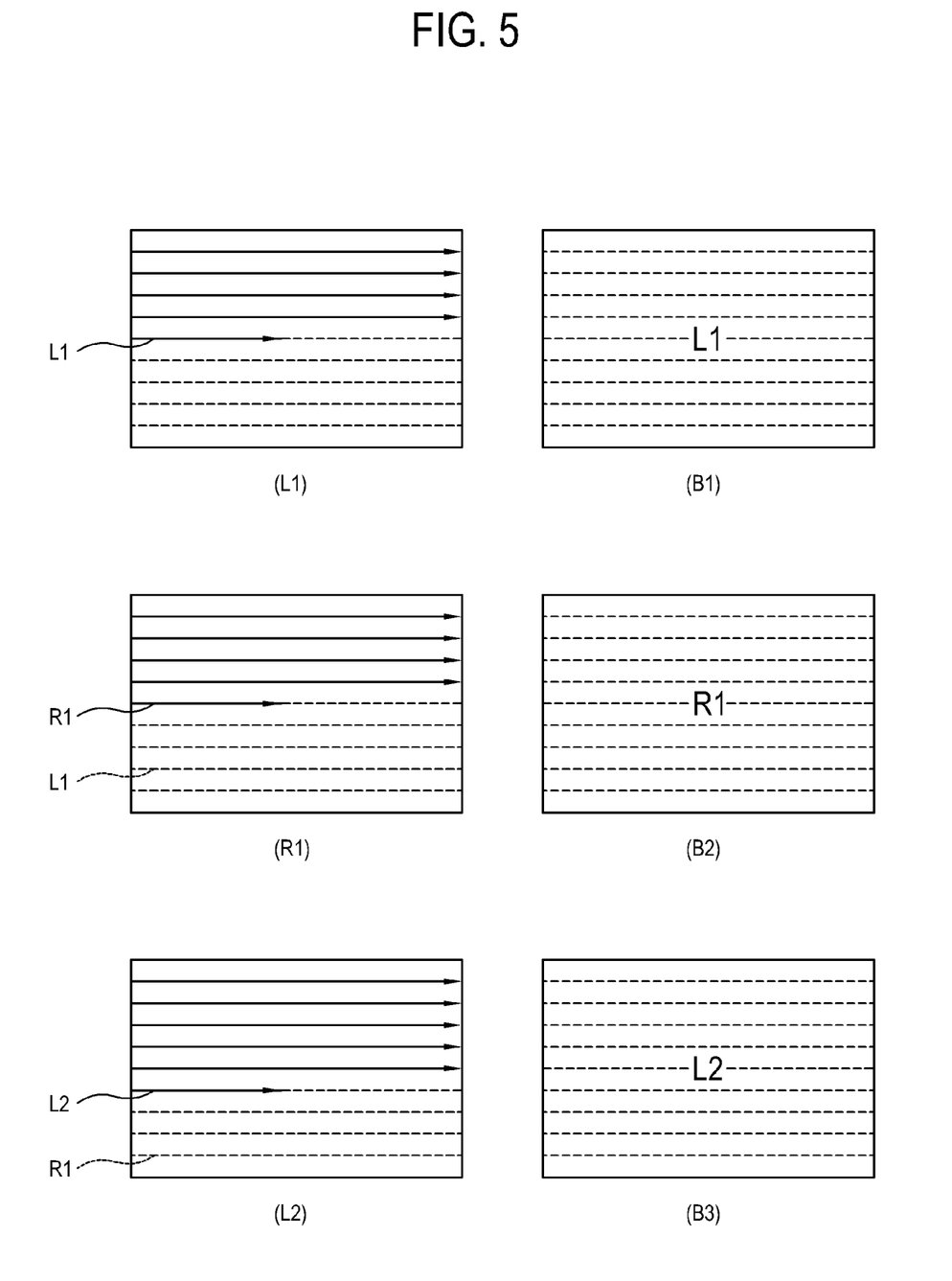
FIG. 5 illustrates an image-displayed state in a scanning section and a blanking section of FIG. 4.

FIG. 5 illustrates an example that the image processor 300 scans image lines to the display unit 100 according to the sections L1, B1, R1, B2, L2, B3 shown in the graphs (3) and (4) of FIG. 4. In each example, a solid line indicates a scanning line where scanning is being performed at a point of time concerned, and a dotted line indicates a scanning line where scanning is completed and displaying is being performed at a point of time concerned.

An example L1 shows that the image processor 300 scans a left eye image L1 to the display unit 100. The image processor 300 scans a scanning line corresponding to the left eye image L1 from the top to the bottom of the display unit 100.

An example B1 show that the left eye image L1 is being displayed as the left eye image B1 is completely scanned in the example L1. At this time, the left eye image L1 is solely displayed on the display unit 100.

An example R1 shows that the image processor 300 scans a right eye image R1. At this time, since the left eye image L1 is being displayed on the display unit 100, the previously displayed left eye image L1 and the currently scanned right eye image R1 are overlapped in this section. The image processor 300 scans the right eye image R1 from the top of the display unit 100, so that the scanning line of the left eye image L1 can be replaced by the scanning line of the right eye image R1 as time elapses.

An example B2 show that the right eye image R1 is being displayed during the blanking time after the right eye image R1 is completely scanned.

An example L2 show that a left eye image L2 is scanned in the state that the right eye image R1 is displayed.

An example B3 show that the left eye image L2 is being displayed during the blanking time after the left eye image L2 is completely scanned.

In such a manner, when the three-dimensional image is input, the image processor 300 alternately scans the left eye image and the right eye image to the display unit 100. Here, when the three-dimensional image is input, the controller 800 increases the blanking time to be longer as compared with the reference time, and controls the left eye unit 920 and the right eye unit 930 of the shutter-type glasses 900 to be selectively opened and closed in each blanking section (refer to B1, B2 and B3 of FIG. 5).

The three-dimensional image input to the image receiver 200 may have a frame rate lower than a level processible by the image processor 300. Thus, the image processor 300 may increase the frame rate of the input image up to the processible level of the image processor 300, which will be described with reference to FIG. 6.

Figure 6:
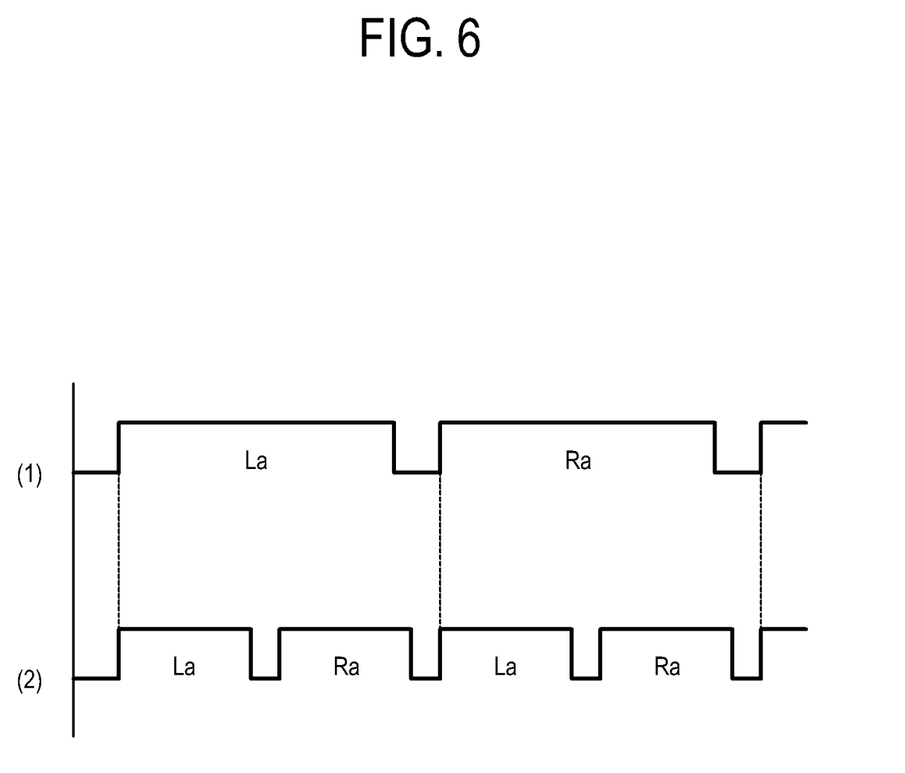
FIG. 6 is a duty ratio graph showing a method of increasing a frame rate of an input image in the display apparatus of FIG. 1.

FIG. 6 is a duty ratio graph showing a method of increasing a frame rate of an input image in this embodiment. Here, a horizontal axis of the graph indicates time.

The graph (1) of FIG. 6 shows a case of scanning without changing the frame rate of the three-dimensional image input to the image receiver 200.

For example, if the input image has a frame rate of 60 Hz and a frame rate processible by the image processor 300 is 120 Hz, the left eye image La and the right eye image Ra each have a frame rate of 30 Hz. However, as each frame rate of the left eye image La and the right eye image Ra is lowered into 30 Hz, a flicker may occur.

Accordingly, if the three-dimensional image is input with the frame rate of 60 Hz, this frame rate is increased up to 120 Hz, i.e., to a level processible by the image processor 300, thereby preventing a flicker.

The graph (2) of FIG. 6 shows a case that the frame rate is increased twice as high as the case of the graph (1).

During a predetermined time period, the left eye image La and the right eye image Ra are scanned once in the case of the graph (1). On the other hand, the left eye image La and the right eye image Ra are scanned twice in the case of the graph (2).

Here, if the left eye image La and the right eye image Ra are not alternately scanned, it is similar to the case of the graph (1), so that it is difficult to prevent a flicker. Accordingly, the left eye image La and the right eye image Ra should be alternately scanned to produce satisfactory results from increasing the frame rate.

Figure 7:
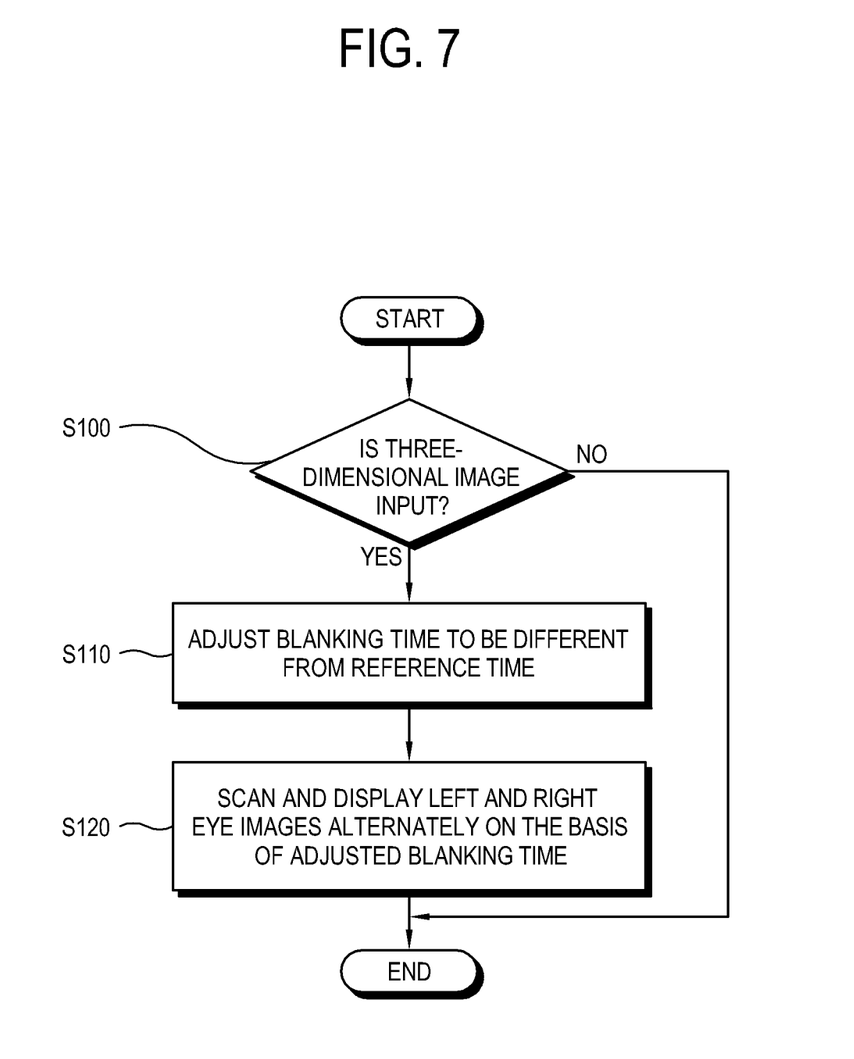
FIG. 7 is a control flowchart schematically showing a control method of the display apparatus in FIG. 1.

With this configuration, a control method of the display apparatus in accordance with the present exemplary embodiment will be described with reference to FIG. 7. FIG. 7 is a control flowchart schematically showing the control method.

Referring to FIG. 7, at operation S100, the controller 800 determines whether an input image received in the image receiver 200 is the three-dimensional image.

In the case of the three-dimensional image, at operation S110, the controller 800 adjusts the blanking time, during which the image processor 300 does not scan an image, to be different from the reference time.

At operation S120, the image processor 300 alternately scans the left eye image and the right eye image to be displayed on the display unit 100 on the basis of the adjusted blanking time.

Figure 8:
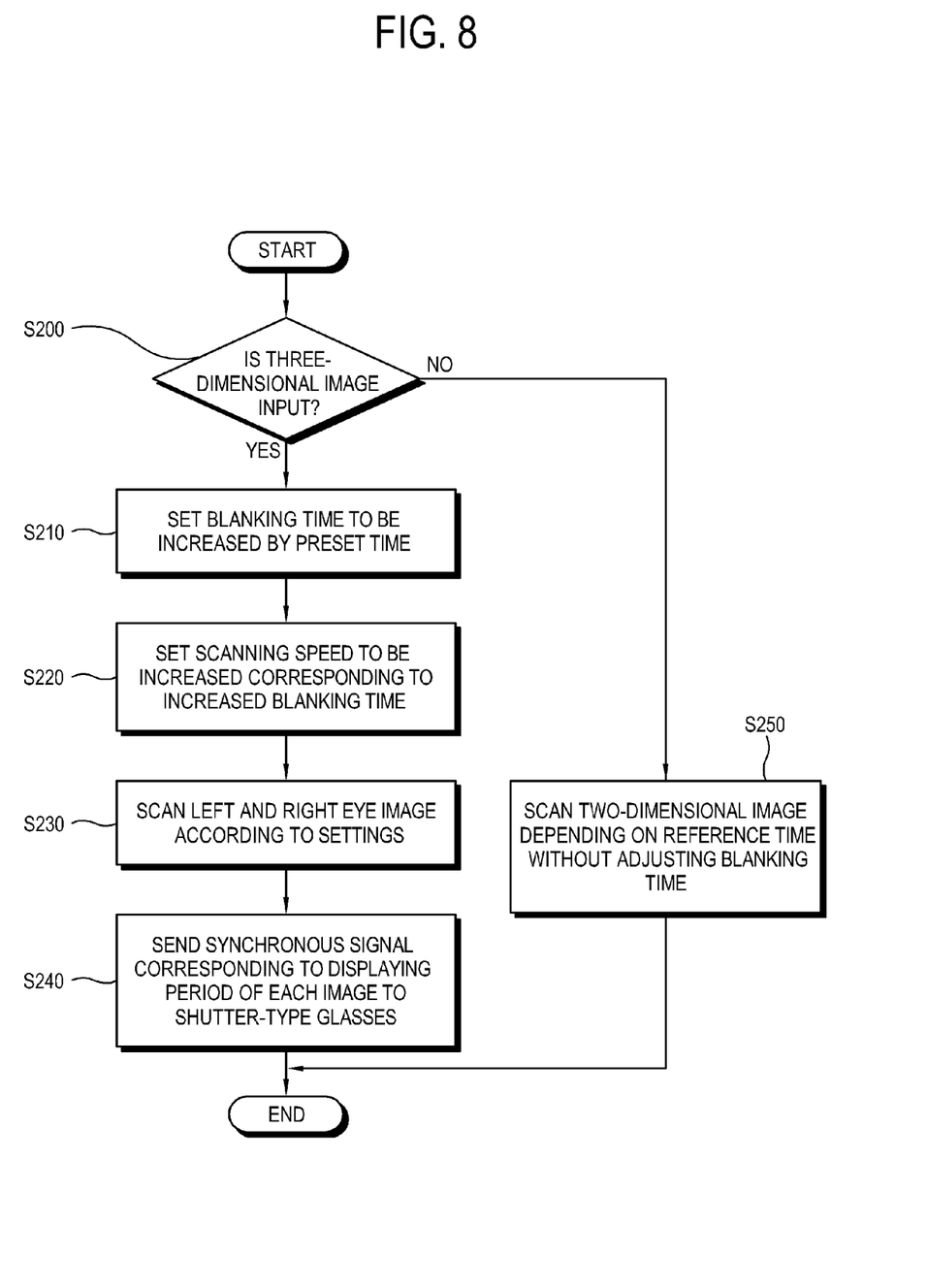
FIG. 8 is a control flowchart showing a method of scanning and displaying a three-dimensional image by adjusting a blanking time in the display apparatus in FIG. 1.

Below, a method of adjusting the blanking time to display the three-dimensional image according to an embodiment of the present invention will be described with reference to FIG. 8. FIG. 8 shows a control flowchart of this method.

As shown in FIG. 8, at operation S200, the controller 800 determines whether the input image is the three-dimensional image.

In the case of the three-dimensional image, the controller 800 sets the blanking time to be increased by the preset time at operation S210 and sets the scanning speed to be increased according to the increased the blanking time at operation S220.

At operation S230, the image processor 300 scans the left eye image and the right eye image to the display unit 100 according to the above settings.

At operation S240, the controller 800 transmits the synchronous signal corresponding to the displaying period of each image to the shutter-type glasses 900.

On the other hand, it is determined at the operation S200 that the input image is not the three-dimensional image, but instead is the two-dimensional image, the controller 800 scans the two-dimensional image on the basis of the reference time without adjusting the blanking time at operation S250.

Figure 9:
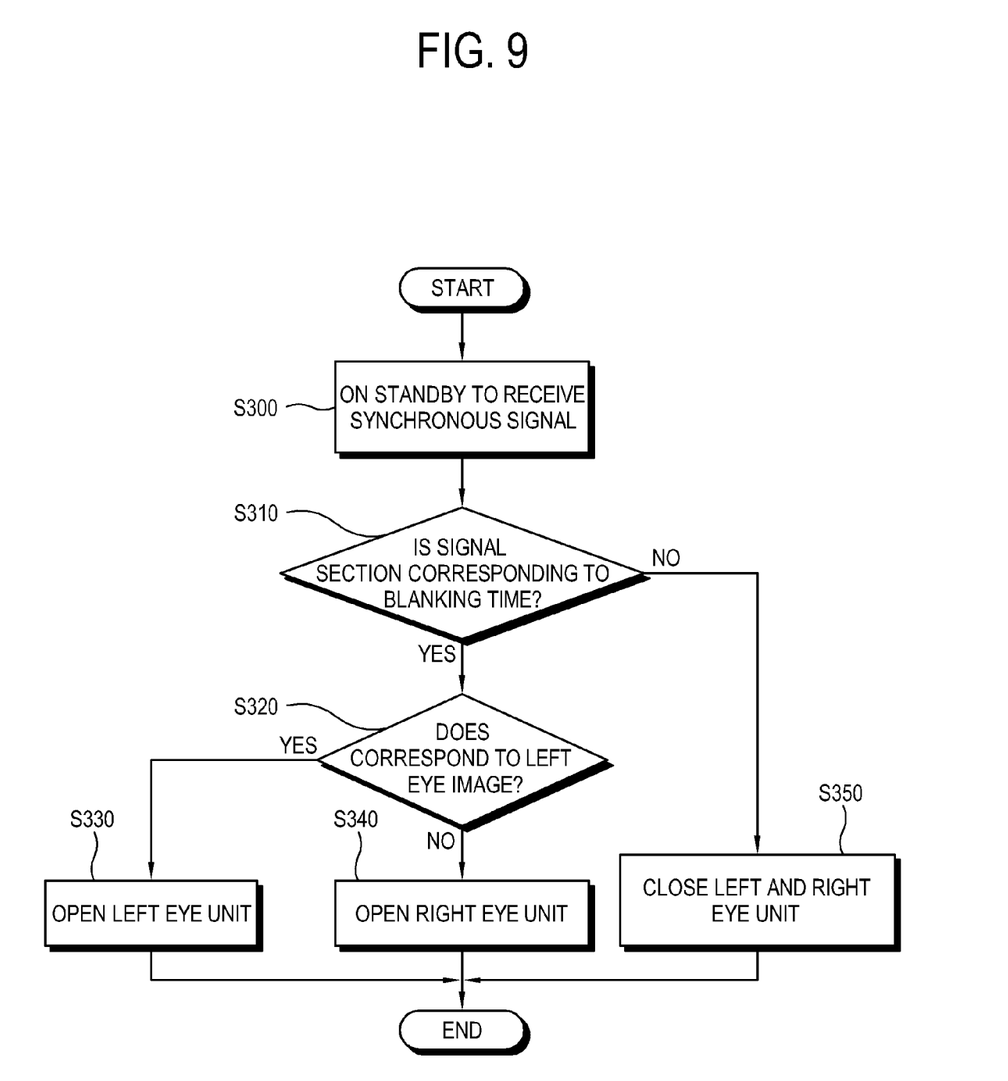
FIG. 9 is a control flowchart showing a method of controlling shutter-type glasses according to the processes of FIG. 8.

Below, a method of controlling the shutter-type glasses 900 in correspondence with the process of FIG. 8 will be described with reference to FIG. 9. FIG. 9 is a control flowchart showing this method, which succeeds the process of FIG. 8 with respect to time.

As shown in FIG. 9, at operation S300, the shutter controller 940 is on standby to receive the synchronous signal from the synchronous signal communicator 600.

If the synchronous signal is received in the synchronous signal receiver 910, the shutter controller 940 determines whether a predetermined signal section of the synchronous signal corresponds to the blanking time at operation S310.

If it is determined that the signal section corresponds to the blanking time, at operation S320 the shutter controller 940 determines whether this section corresponds to the left eye image.

If it is determined that the section corresponds to the left eye image, the shutter controller 940 opens the left eye unit 920 at operation S330, so that a user's left eye can recognize the left eye image. On the other hand, if it is determined that the section corresponds to the right eye image, the shutter controller 940 opens the right eye unit 930 at operation S340.

On the other hand, if it is determined at the operation S310 that the signal section does not correspond to the blanking time, but instead corresponds to the image scanning section, the shutter controller 940 closes the left eye unit 920 and the right eye unit 930 at operation S350.

Thus, a user recognizes the left eye image and the right eye image through his/her left and right eyes, respectively, thereby recognizing the three-dimensional image.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
    an image receiver which receives an image from an external source;
    an image processor which is configured to process the received image; and
    a controller which is configured to determine whether the received image is a two-dimensional (2D) image or a three-dimensional (3D) image, adjust a blanking time to be different from a reference time if the received image is the 3D image or set the blanking time to be equal to the reference time if the received image is the 2D image, and control the image processor to scan the received image on a display based on the adjusted blanking time or the set blanking time.

2. The display apparatus according to claim 1, wherein the controller is configured to adjust the blanking time to be longer than the reference time by a preset time.

3. The display apparatus according to claim 1, further comprising:
    a synchronous signal communicator which communicates with shutter-type glasses; and
    a synchronous signal generator which generates a synchronous signal corresponding to a displaying period of the 3D image and sends the synchronous signal to the shutter-type glasses through the synchronous signal communicator.

4. The display apparatus according to claim 1, wherein the controller is configured to increase a frame rate for the 3D image up to a level processible by the image processor if the frame rate is lower than the processible level.

5. The display apparatus according to claim 4, wherein the controller is configured to control the image processor to scan the 3D image based on the increased frame rate if the frame rate.

6. A method of controlling a display apparatus, the method comprising:
    receiving an image from an external source;
    determining whether the received image is a two-dimensional (2D) image or a three-dimensional (3D) image;
    adjusting a blanking time to be different from a reference time or setting the blanking time to be equal to the reference time, based on a result of the determining;
    image-processing the received image, based on the result of the determining; and
    scanning the received image on a display based on the adjusted blanking time or the set blanking time.

7. The method according to claim 6, wherein the adjusting the blanking time comprises increasing the blanking time to be longer than the reference time by a preset time.

8. The method according to claim 6, wherein the adjusting the blanking time comprises increasing a frame rate for the 3D image up to a level processible by an image processor if the frame rate is lower than the processible level.

9. A display system comprising:
    a display apparatus which is configured to receive an image from an external source and display the received image on a display,
    the display apparatus comprising:
    an image processor which is configured to process the received image; and
    a controller which is configured to determine whether the received image is a two-dimensional (2D) image or a three-dimensional (3D) image, adjust a blanking time to be different from a reference time if the received image is the 3D image, set the blanking time to be equal to the reference time if the received image is the 2D image, and control the image processor to scan the received image on the display based on the adjusted blanking time or the set blanking time, wherein the display system further comprises shutter-type glasses which selectively transmit and interrupt light synchronously with a displaying period of the 3D image.

10. The display system according to claim 9, wherein the controller is configured to adjust the blanking time to be longer than the reference time by a preset time.

11. A display system comprising:
a display apparatus which is configured to receive an image from an external source and display the received image on a display,
the display apparatus comprising:
an image processor which is configured to process the received image;
an image detector which is configured to detect whether the received image is a two-dimensional (2D) image or a three-dimensional (3D) image and output a detection result; and
a controller which is configured to receive the detection result from the image detector, adjust a blanking time to be different from a reference time if the received image is the 3D image or set the blanking time to be equal to the reference time if the received image is the 2D image, and control the image processor to scan the received image on the display based on the adjusted blanking time or the set blanking time,
wherein the display system further comprises shutter-type glasses which selectively transmit and interrupt light synchronously with a displaying period of the 3D image.

12. The display system according to claim 9, wherein the controller is configured to increase a frame rate for the 3D image up to a level processible by the image processor if the frame rate is lower than the processible level.

13. The display system according to claim 11, wherein the controller is configured to increase the blanking time to be longer than the reference time by a preset time.

14. The display system according to claim 11, wherein the controller is configured to increase a frame rate for the 3D image up to a level processible by the image processor if the frame rate is lower than the processible level.

15. The method according to claim 6, wherein the determining is performed by a controller of the display apparatus.

16. The method according to claim 6, wherein the determining is performed by an image detector of the display apparatus.

17. A display apparatus comprising:
an image receiver which receives an image from an external source;
an image processor which is configured to process the received image;
an image detector which is configured to detect whether the received image is a two-dimensional (2D) image or a three-dimensional (3D) image and output a detection result;
a controller which is configured to receive the detection result from the image detector, adjust a blanking time to be different from a reference time if the received image is the 3D image or set the blanking time to be equal to the reference time if the received image is the 2D image based on the detection result, and control the image processor to scan the received image on a display based on the adjusted blanking time or the set blanking time.

18. The display apparatus according to claim 17, wherein the controller is configured to adjust the blanking time to be longer than the reference time by a preset time.

19. The display apparatus according to claim 17, further comprising:
a synchronous signal communicator which communicates with shutter-type glasses; and
a synchronous signal generator which generates a synchronous signal corresponding to a displaying period of the 3D image and sends the synchronous signal to the shutter-type glasses through the synchronous signal communicator.

20. The display apparatus according to claim 17, wherein the controller is configured to increase a frame rate for the 3D image up to a level processible by the image processor if the frame rate is lower than the processible level.

21. The display apparatus according to claim 20, wherein the controller is configured to control the image processor to scan the 3D image based on the increased frame rate.

* * * * *